W. F. BAIRD.
Rotary-Churn.
No. 208,783. Patented Oct. 8, 1878.
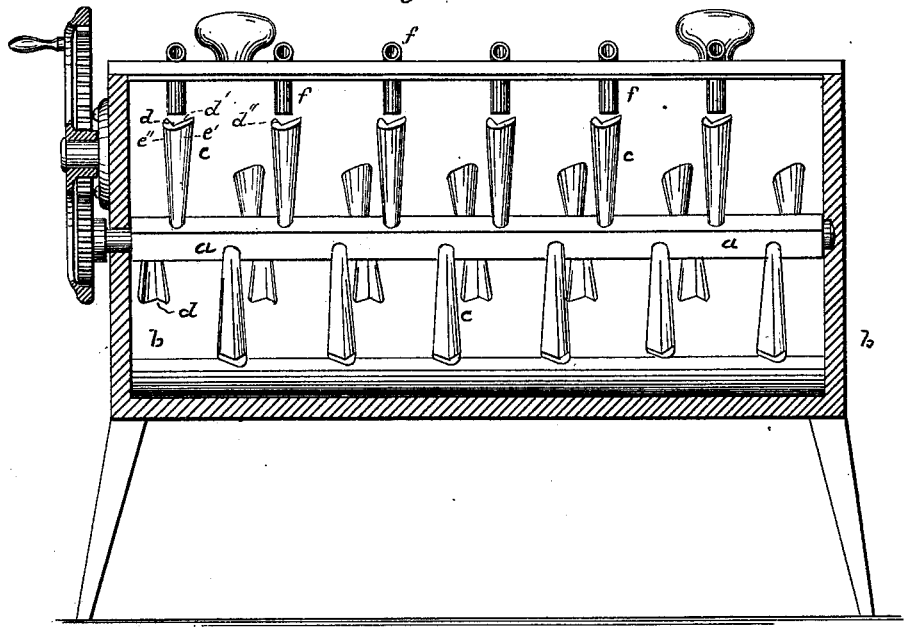
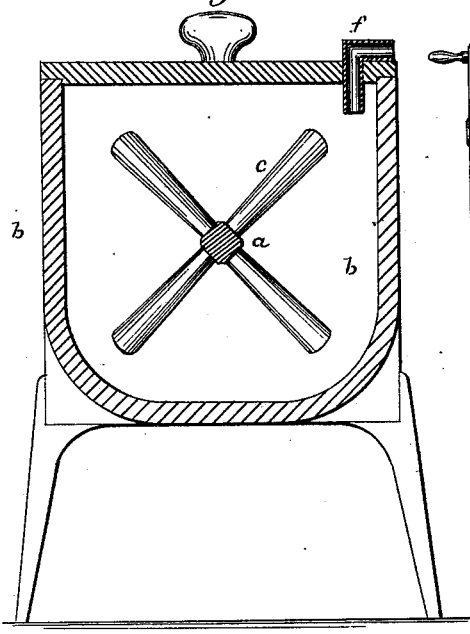
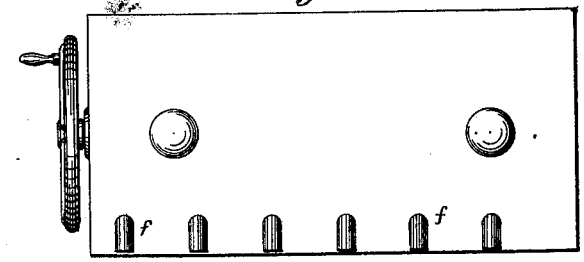
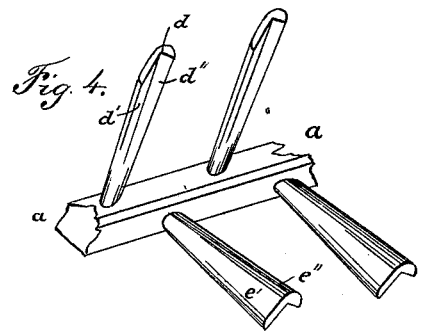
WITNESSES:
INVENTOR:
William F. Baird,

UNITED STATES PATENT OFFICE.

WILLIAM F. BAIRD, OF BURLINGTON, IOWA, ASSIGNOR OF ONE-HALF HIS RIGHT TO JOHN J. FORNEY, OF SAME PLACE.

IMPROVEMENT IN ROTARY CHURNS.

Specification forming part of Letters Patent No. 208,783, dated October 8, 1878; application filed August 15, 1878.

*To all whom it may concern:*

Be it known that I, WILLIAM F. BAIRD, of Burlington, in the county of Des Moines and State of Iowa, have invented certain new and useful Improvements in Rotary Churns; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to the construction of the paddles and the arrangement of the air-tubes of rotary churns; and it consists in the construction of the paddles, which will be fully understood from the following description; and, further, in the arrangement of tubes for admitting air into the churn opposite the ends of the paddles, the paddles being constructed with grooves or other devices for carrying the air down into the cream, so that air will be more rapidly and thoroughly mixed with the cream than has heretofore been the case.

Figure 1 is a vertical longitudinal section of a rotary churn embodying my improvements. Fig. 2 is a vertical cross-section of the same. Fig. 3 is a plan of the cover, and Fig. 4 shows the construction of the paddles in detail.

The box of the churn and the gearing for giving a rapid motion to the paddles do not differ essentially from other churns which have been used heretofore.

The shaft $a$ is placed horizontal, and driven by a crank-arm and gearing at one end of the box $b$.

The paddles $c$ are arranged in rows, four in number. They are constructed with an angular groove, $d$, down one side, and this groove has one wide side, $d'$, and a narrow side, $d''$, the angle being approximately a right angle. The back of the paddle has a flat beveled side, $e'$, corresponding to the side $d'$ of the groove, and a rounded edge, $e''$, extending from the beveled side $e'$ round to the edge of the short side $d''$. The paddles are placed on the shaft $a$ so that the beveled sides $e'$ of one row will all slant in one direction at a uniform angle with the shaft, and the beveled sides of the next row will slant in the opposite direction, one row to the right and the next row to the left, thus alternating.

When the paddles are rotated in one direction so that the edges strike the cream, the globules in the cream are broken by the contact; and as each row of paddles is inclined at an opposite angle from the preceding row, the cream is thrown first toward one end of the churn by one row of paddles, and then the next row instantly reverses the action of the former, thus creating a severe agitation of the cream throughout the entire length of the churn, and this operation is performed four times during each revolution of the shaft.

A row of small air-tubes, $f$, is placed preferably along one side of the cover. Each tube is located in the same vertical plane with the groove $d$ of one of the paddles, and the lower end of the tube projects down into the churn, its opening coming close to the end of the paddle as it revolves. The upper ends of the tubes are bent over into a horizontal position, so that no dirt can enter and rest on the top of the cover. The number of air-tubes $f$ does not equal the entire number of paddles, and as the paddles of one row are not in the same vertical planes with the paddles of the preceding row, there will be cases where a paddle does not come directly opposite a tube; but the tubes are distributed equally along the length of the churn, so that the air is evenly introduced, and each tube has one or more paddles, which revolve in its plane. The tubes $f$ are vertical, and are placed as nearly tangent to the paddles as possible; and when the paddles are revolved in the direction that brings the grooved sides upward, each groove, being an air-chamber, produces a vacuum, and draws down some fresh air and causes a current of pure air, which is directly forced into the cream and thoroughly mixed with it.

When the butter is being worked and salted the construction and arrangement of the paddles hasten the work materially. The butter is worked back and forth from one side to the other by the beveled arms, and by a backward turn of the paddles the position of the butter is entirely changed; and if the paddles are worked alternately backward and forward the two edges of the paddle on the grooved side separate the butter, and the single edge on the other side closes the openings previously made. It is thus completely washed, worked, and salted.

The rounded edge $e''$ of each paddle, when they are revolved so that the grooves come uppermost, permits the cream, when set in motion by the beveled side $e'$ of the neighboring arm, to slide over into the groove $d$, thus inclosing the air in the groove and carrying it down into the cream.

What I claim as my invention, and desire to secure by Letters Patent, is—

1. A paddle for a rotary churn having the groove $d$, with the broad side $d'$ and the narrow side $d''$, and the beveled side $e'$ and rounded edge $e''$, the paddle being placed at an angle with the shaft, substantially as described, and for the purpose set forth.

2. The air-tubes $f$, in combination with paddles constructed so that they can carry air down into the cream when placed in the same vertical plane with the paddles, substantially as described, and for the purpose set forth.

3. The air-tubes $f$, distributed uniformly along the length of the churn in close proximity to the ends of the paddles, substantially as described, and for the purpose set forth.

In testimony that I claim the foregoing as my own I affix my signature in presence of two witnesses.

WILLIAM F. BAIRD.

Witnesses:
WILLIAM E. WALDO,
JAMES STERLING.